(12) United States Patent
Scherer et al.

(10) Patent No.: US 12,129,386 B2
(45) Date of Patent: Oct. 29, 2024

(54) PRODUCTION OF PIGMENTS HAVING A DEFINED SIZE AND SHAPE

(71) Applicant: Giesecke+Devrient Currency Technology GmbH, Munich (DE)

(72) Inventors: Maik Rudolf Johann Scherer, Grainau (DE); Kai Herrmann Scherer, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 378 days.

(21) Appl. No.: 17/504,925

(22) Filed: Oct. 19, 2021

(65) Prior Publication Data

US 2022/0119655 A1    Apr. 21, 2022

(30) Foreign Application Priority Data

Oct. 20, 2020   (DE) ............... 10 2020 006 456.6

(51) Int. Cl.
| | |
|---|---|
| *C09D 11/037* | (2014.01) |
| *C09B 67/20* | (2006.01) |
| *C09C 3/00* | (2006.01) |

(52) U.S. Cl.
CPC .......... *C09D 11/037* (2013.01); *C09B 67/006* (2013.01); *C09C 3/00* (2013.01); *C01P 2004/30* (2013.01); *C01P 2004/61* (2013.01); *C01P 2004/62* (2013.01)

(58) Field of Classification Search
CPC .. C09D 11/037; B42D 25/324; B42D 25/369; B42D 25/373; B42D 25/425; B42D 25/328; C09C 3/00; C09C 1/0015; C09C 1/64; C09B 67/006; C01P 2004/30; C01P 2004/62; C01P 2004/61
See application file for complete search history.

(56) References Cited

U.S. PATENT DOCUMENTS

| | | |
|---|---|---|
| 9,095,899 B2 | 8/2015 | Szuscik-Machnicki et al. |
| 9,850,385 B2 | 12/2017 | Szuscik-Machnicki et al. |
| 2020/0283636 A1 | 9/2020 | Fuhse et al. |
| 2020/0291238 A1 | 9/2020 | Scherer et al. |

FOREIGN PATENT DOCUMENTS

| | | |
|---|---|---|
| EP | 2021401 A2 | 2/2009 |
| EP | 2039729 A2 | 3/2009 |
| EP | 2062947 A1 | 5/2009 |
| WO | 2007105001 A2 | 9/2007 |
| WO | 2019057322 A1 | 3/2019 |

OTHER PUBLICATIONS

German Search Report from corresponding DE Application No. 102020006456.6, May 21, 2021.

*Primary Examiner* — Monica A Huson
(74) *Attorney, Agent, or Firm* — Workman Nydegger (57) ABSTRACT

A process for producing pigments having a defined size and shape and also pigments produced by this process. The process has the steps: a) production of a three-dimensional surface structure on a substrate, with surface regions which are in each case partly bounded by a plurality of three-dimensional structural elements and are arranged in gaps being formed; b) application of a pigment material layer to the surface structure; c) detachment of the pigment material layer from the surface structure and production of pigments.

16 Claims, 9 Drawing Sheets

PRODUCTION OF PIGMENTS HAVING A DEFINED SIZE AND SHAPE

BACKGROUND

The invention relates to a process for producing pigments having a defined size and shape, and also pigments produced thereby.

Production processes for producing pigments or particles are known from EP2021401 A2, WO2007105001 A2, U.S. Pat. No. 9,095,899 B2 and U.S. Pat. No. 9,850,385 B2. Here, intended fracture positions in a layer from which the pigments or particles are produced are provided in a matrix onto which the layer is applied, by provision of separate cells which are enclosed by walls or frames. EP2039729 A2 and EP2062947 A1 describe similar production processes in which embossed or etched frames are produced. The production processes mentioned are used to produce intended fracture positions which correlate with the frames/walls of the matrix in the layer from which the pigments or particles are produced.

These production processes lead to a high proportion of the matrix surface being covered by the walls or frames. As a result, the yield of pigments is significantly reduced, particularly when pigments having small dimensions are to be produced. Furthermore, a large amount of small fragments can be formed thereby, and these impair the visual appearance of the pigments. Furthermore, parts of the layer from which the pigments are produced, said parts being applied to the walls/frames of the matrix, can undesirably remain on the actual pigments. This can lead to undesirable optical effects, particularly on inclined surfaces of the walls/frames.

SUMMARY

A process for producing pigments of high quality in high yield should therefore be provided.

One embodiment relates to a process for producing pigments having a defined size and shape, comprising the steps: a) production of a three-dimensional surface structure on a substrate, with surface regions which are in each case partly bound by a plurality of three-dimensional structural elements and are arranged in gaps being formed; b) application of a pigment material layer to the surface structure; c) detachment of the pigment material layer from the surface structure and production of pigments.

Partly bounded surface regions of the surface structure are produced by the process. In other words, adjacent surface regions are only partly separated from one another by the three-dimensional structural elements. In addition, the partial bounding of each surface region is effected by a plurality of three-dimensional structural elements. In other words, the bounded three-dimensional structural elements of each surface region are fragmented. Thus, the surface regions are not separated from one another by continuous walls or frames. As a result, the occupation of the surface by the three-dimensional structural elements is minimized and the pigment yield is optimized.

The three-dimensional structural elements additionally lead, on detachment of the pigment material layer or in a subsequent process step, to fracture along the connecting line between the nearest neighbours of the three-dimensional structural elements. The three-dimensional structural elements and their connecting lines between nearest neighbours thus provide intended fracture positions and fracture lines on detachment of the pigment layer and produce the pigments in step c). The intended fracture positions do not correspond exactly to the three-dimensional structural elements, but instead also encompass the fracture lines. The fracture lines lead predominantly to clean fracture edges which run at an angle, in some examples perpendicularly, to the surface of the pigment, with reduction of artefacts at the fracture edges. This prevents active and costly pigment material being lost at the fracture line between the three-dimensional structural elements. At the same time, a high quality of the pigments produced is obtained.

The process thus makes it possible both to reduce material losses and also to achieve an optimal pigment quality and yield per unit area in the production of pigments having a defined shape and size. The latter means that the area occupied by the three-dimensional structural elements is minimized and the pigment yield is optimized. The lower the loss of material and the higher the pigment yield, the more economically can the pigments be produced.

In addition, the amount of small fragments formed on detachment of the pigment layer is reduced by the low surface occupation with the three-dimensional structural elements. Furthermore, the amount of parts of the pigment layer which were applied to the walls/frames of the surface structure and remain on the pigments after detachment is minimized. Thus, the quality of the pigments produced is optimized. In addition, a well-defined, narrow size distribution of the pigments can be obtained, so that milling of the pigments after detachment of the pigment material layer from the surface structure can be omitted.

In the process, from 1% to 99%, preferably from 10% to 90%, more preferably from 30% to 70%, of the surface regions can be bounded by the three-dimensional structural elements. This makes it possible for the length of the fracture lines between the nearest neighbours of the three-dimensional structural elements to be varied, providing the above-mentioned positive effects of the surface structure formed in the process. In addition, the degree of fragmentation of the three-dimensional structural elements, i.e. the extent of interruptions between the three-dimensional structural elements, can be varied, e.g. as a function of the pigment material.

In the process, the surface structure and/or the surface regions can be occupied to an extent of from 0.1 to 10%, preferably less than 7%, by the three-dimensional structural elements. Such a degree of occupation by the three-dimensional structural elements increases the chance of the three-dimensional structural elements not impairing the optical appearance of the pigments produced.

In the process, the three-dimensional structural elements can be arranged separately from one another. This makes it possible, as indicated above, to form the fracture lines between the nearest neighbours of the three-dimensional structural elements. Furthermore, the three-dimensional structural elements can be arranged, when seen in plan view onto the surface structure, at corners and/or sides of the surface regions. The abovementioned measures minimize the occupation of the surface by the three-dimensional structural elements and promote an optimal pigment yield.

In the process, every boundary between adjacent surface regions can be provided with at least two of the three-dimensional structural elements which are arranged along the boundary. As a result, the above-described fracture line is provided at each boundary between adjacent surface regions. Furthermore, at least part of the adjacent surface regions can be configured with a partially contiguous surface. This applies particularly to surface regions which are formed at the same height level relative to a base level of the surface structure. A partly contiguous surface of adjacent surface regions simplifies the production process.

In the process, at least part of the three-dimensional structural elements can, seen in plan view onto the surface structure, be configured as a regular pattern which partly bounds the surface regions. Furthermore, at least part of the three-dimensional structural elements can, seen in plan view onto the surface structure, be configured as a pattern selected from among a polygonal pattern, a pattern of mutually complementary shapes and a free-form pattern. A finely structured pattern of the three-dimensional structural elements also makes it possible to realize corresponding, complicated shapes of the pigments, for example Escher motifs.

In the process, at least part of the surface regions can be configured parallel to a base level, in particular to a plane of the base level, of the surface structure. Furthermore, at least part of the surface regions can be configured with a gradient running at an angle to a base level of the surface structure. These measures enable the surface structure to be provided with parallel and/or inclined surfaces, which can have a favourable effect on the quality of the pigments, depending on the method used for producing the surface structure in step a).

In the process, at least part of the surface regions can be at the same height level. This assists the formation of the abovementioned fracture edges. It is possible for at least part of the surface regions to be at different height levels. This can simplify the formation of the fracture edges. In the process, at least part of adjacent surface regions can also be at different height levels. This assists differentiation of adjacent pigments in step c) on detachment of the pigment layer.

In the process, at least part of the three-dimensional structures can be configured as raised regions arranged between the surface regions. As an alternative or in addition, at least part of the three-dimensional structural elements can be configured as depressions arranged between the surface regions. Here, the surface structure together with the three-dimensional structural elements can be provided with binary, e.g. parallel, or non-binary, e.g. V-shaped, cross-sectional profiles. The binary profiles represent a very good intended fracture position. In the case of non-binary profiles, the pigment layer can be applied relatively thinly but continuously in the region of the wall. The degree of fragmentation of the three-dimensional structural elements can vary. For example, the surface regions can be separated from one another to a large extent by the three-dimensional structural elements. In other examples, the surface regions can be separated from one another to a small extent by the three-dimensional structural elements and additionally be separated from one another by, for example, the height.

Furthermore, at least part of the three-dimensional structural elements can be configured as deaeration structures, e.g. deaeration slits, arranged between the surface regions. These deaeration structures can, in particular, be provided between adjacent surface regions positioned on different height levels than the three-dimensional structural elements. In this way, air inclusions can escape along the deaeration structures when using an embossing process in step a) in the relatively high height levels, in particular in the highest height level, of the surface structure.

In the process, at least part of the three-dimensional structural elements can have a width of from 0.2 µm to 4 µm, preferably from 0.5 µm to 3 µm, and/or a height of from 1 µm to 10 µm, preferably from 2 µm to 6 µm. In particular, the three-dimensional structural elements can be configured as walls or furrows having an appropriate aspect ratio (height to width). For example, colour shift (CS) pigments having a double CS coating and a typical total layer thickness of about 1 µm can have a width of the three-dimensional structures which is not less than about 2 µm. The dimensions of the surface regions can be from 5 µm to 50 µm, preferably from 15 µm to 35 µm. Furthermore, at least part of the three-dimensional structural elements can have identical or different dimensions, in particular identical or different heights and/or widths. A finely structured pattern of the three-dimensional structural elements also makes it possible to realize complicated shapes of the pigments, for example Escher motifs.

In the process, at least part of the surface regions can be formed with the same size and/or same shape. This promotes the production of a well-defined, narrow size distribtuion of the pigments. The provision of surface regions of the same shape leads to a high yield of essentially similarly shaped pigments.

The surface regions can also be arranged in parallel gaps adjoining one another. A regular pattern of the surface regions can be produced by these measures. At the same time, the number of surface regions per unit area of the surface structure is optimized. Measures for forming a regular arrangement and/or regular pattern of the surface regions can increase the yield of essentially similarly shaped pigments. In addition, a well-defined, narrow size distribution of the pigments can be obtained, so that milling of the pigments after detachment of the pigment material layer from the surface structure can be omitted.

In the process, at least part of the surface regions can, seen in plan view onto the surface structure, be provided with a contour selected from among a polygonal contour, a mutually complementary contour and a free-form contour. For example, the surface regions each have a face having a polygonal contour or a contour of an Escher motif. This increases the variety of shapes of the pigments which can be produced. The abovementioned measures assist the formation of regular, pseudoperiodical or random pigment shapes.

Furthermore, at least part of the surface regions can be provided with one or more markings, e.g. by embossing. Owing to their profile height and/or configuration, these do not lead to intended fracture positions in the pigment material layer. For example, markings of the surface regions in the form of Escher motifs can be used as basis for corresponding marking of the pigments, e.g. on areas of the surface regions. The surface regions can also be provided with markings for producing, for example, holograms, nanostructures and/or micromirrors for optical effects.

In embodiments of the process, the production of the three-dimensional surface structure on the substrate in step a) can be carried out at least partly by an embossing process. For example, an embossing layer can be applied to the substrate and then be embossed. As an alternative, the surface of the substrate can be embossed or the substrate can be cast with the three-dimensional surface structure. The embossing process can, for example, be carried out in a roll-to-roll process. The substrate can be, for example, a carrier film, e.g. composed of PET (polyethylene terephthalate), PE (polyethylene), PC (polycarbonate), PVC (polyvinyl chloride), PMMA (polymethyl methacrylate) or a combination thereof. The substrate can alternatively be made of a rigid material such as silica or glass.

In step a) of the process, the production of the three-dimensional surface structure can be effected by a method selected from among: a1) an embossing process comprising the steps: application of a soluble, in particular water-soluble embossing layer as release layer to the substrate and performance of a lithographic, in particular photolithographic, process, hot embossing or UV embossing; and/or a2) an embossing process comprising the steps: provision of a substrate which can be deformed by means of hot embossing or application of an insoluble embossing layer to the substrate, performance of hot embossing or UV embossing; and application of a soluble, in particular water-soluble, release layer. The advantages of embodiments of the process can be realized particularly comprehensively using the abovementioned methods. Furthermore, markings can be embossed in steps a1) and/or a2), for example to produce flat holograms, nanostructures and/or micromirrors on the pigments for optical effects.

In step a1), it is possible to use lithographic processes which involve illumination and development and in which a release coating applied as release layer is simultaneously utilized as a photolithographic resist. Furthermore, the UV embossing can be carried out by irradiation of the release layer with UV light, where the release layer contains or is formed by a soluble embossing coating which can be cured in the UV frequency range.

In step a2), the release layer can be applied in a layer thickness of from 50 to 7000 nm, preferably from 100 to 5000 nm. Furthermore, the release layer can be applied as a layer which essentially conforms or does not conform to the three-dimensional surface structure, e.g. in an essentially constant layer thickness. The embossing layer can contain an insoluble hot-embossing or UV coating or be formed thereby. When step a2) is employed, the substrate provided with the embossing layer can be reused.

In step b) of embodiments of the process, a pigment material layer containing one or more inorganic materials and/or one or more organic materials can be applied to the surface structure. For example, a pigment material layer can be applied by vapor deposition (Physical Vapour Deposition PVD, Chemical Vapour Deposition CVD) or other coating methods in step b). Application of the pigment material layer can also be carried out in a roll-to-roll process. The pigment material layer can be configured as monolayer or as multilayer composed of identical or different materials. The pigment material layer can be a metallization or contain a metallization. As materials for the pigment material layer, it is possible to use, for example, either individually or in any combination in one or more layers: a colour shift (CS) material (thin layer interference coating), a phase change material; a magnetic material; one or more identical or different materials selected from among a metal, an alloy, a dielectric, an oxide, a sulfide and a fluoride. For example, it is possible to use a colour shift material in the form of or with a phase change material or to use a magnetic colour shift material. Furthermore, the pigment material layer can also comprise one or more organic layers which are, for example, applied by means of PVD, CVD, printing or spraying.

In step c) of the process, detachment can be effected by: mechanical detachment, e.g. by means of a scraper, use of an embossing or metal transfer, use of a release layer and/or a template layer and detachment thereof. Detachment can, for example, be carried out in a roll-to-roll process. During detachment, the pigment material layer can be broken up into fragments. In this way, the pigments can be produced directly in the desired size and shape and costly milling of the pigments can be avoided. As an alternative on in addition, the detached pigment material layer or the fragments thereof and/or the pigments can be milled. The milling parameters are selected so that the pigment material layer breaks along the intended fracture positions provided.

A surface treatment of the pigments and/or drying of the pigments can be carried out. For example, the pigment material layer can be detached by detachment of a release layer applied underneath the pigment material layer during the course of the process from the surface structure using a solvent, in particular water. The release layer here can be, in particular, one of the release layers produced by the abovementioned steps a1) and a2). If a carrier film is used as substrate and a surface structure having depressions as the three-dimensional structural elements is formed on this, a dry stripping process can also be used for detachment of the pigment material layer in step c).

A further embodiment provides pigments produced by a process according to one of the preceding claims.

Another embodiment relates to a use of pigments of the abovementioned embodiment in a printing ink.

BRIEF DESCRIPTION OF THE DRAWINGS

The invention will be illustrated in more detail below with the aid of working examples with reference to the accompanying drawings, which likewise disclose features important to the invention. These working examples serve merely for the purposes of illustration and should not be interpreted as constituting any restriction. For example, a description of a working example having a plurality of elements or components should not be interpreted as meaning that all these elements or components are necessary for implementation. Rather, other working examples can also contain alternative elements and components, fewer elements or components or additional elements or components. Elements or components of various working examples can be combined with one another, unless the contrary is indicated. Modifications and variations described for one of the working examples can also be applicable to other working examples. To avoid repetition, identical or corresponding elements in various figures are denoted by the same reference numerals and not explained repeatedly. The figures show.

DETAILED DESCRIPTION

In the description of value ranges below, the indication of a wide range with narrower alternative or preferred ranges is also intended to disclose ranges which can be formed by any combination of indicated lower range limits with indicated upper range limits. The expression "gradient running obliquely to a base level of the surface structure" and modifications thereof can in the present text mean that the gradient relative to a plane of the base level is from 0.01 to 1, preferably from 0.02 to 0.75, particularly preferably from 0.05 to 0.5.

Figure 1A:
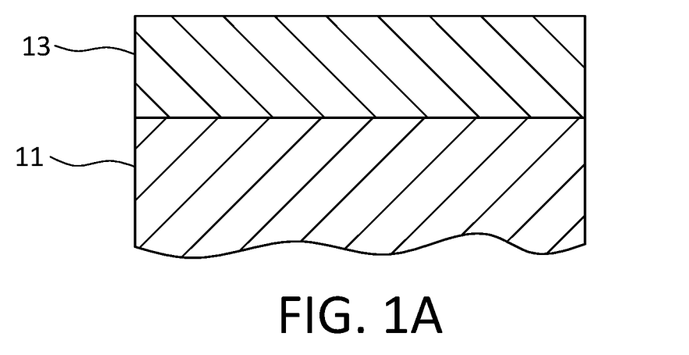
FIGS. 1a to 1c show a layer sequence of steps of a first working example of the process with schematic cross-sectional views.
Figure 1B:
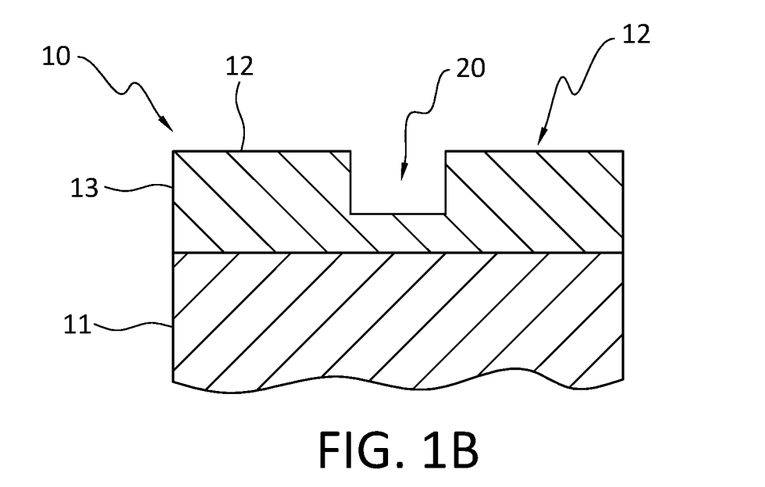
Figure 1C:
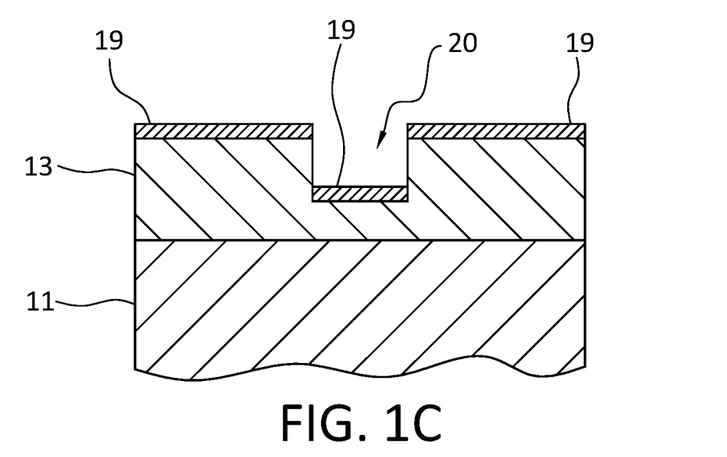

FIG. 1a to 1c show a layer sequence of steps of a first working example of the process with schematic cross-sectional views. In the first working example, a three-dimensional surface structure is produced by an embossing process in step a) of the process, which corresponds to step S1 in the flow diagram of FIG. 9.

For this purpose, as is shown in FIG. 1a, a carrier film composed of PET (polyethylene terephthalate) is provided as a substrate 11 onto which an embossing layer composed of a soluble embossing coating 13, which also functions as release layer, is applied. A water-soluble embossing layer composed of, for example, polyvinylpyrrolidone (PVP), modified starch, polyacrylic acid, polyethylene glycol, hydroxypropyl cellulose, hydroxyethyl cellulose, casein, gum arabic, carboxymethyl cellulose, polyvinyl alcohol (PVOH), dextrin or a mixture of two or more of the abovementioned materials, is produced as a thermoplastic hot embossing coating to the carrier film by a roll-to-roll process. In the present example, PVOH is used. The water-soluble embossing layer can be printed on in a layer thickness of from 500 nm to 20 µm. The release layer can, for example, be applied by means of gravure printing, flexographic printing, slot nozzle or spray nozzle. Alternative thermoplastic hot embossing coatings can be selected from among, for example, PMMA, PVA, PS, which are soluble in solvents other than water.

After this, as is shown in FIG. 1b, a surface structure 10 with essentially similarly shaped surface regions 12 at the same height level is produced by hot embossing the embossing coating 13 in a roll-to-roll process. The embossing coating can be embossed only partly here. As an alternative, a thermoplastically deformable carrier film can also be hot-embossed. The surface regions 12 are each partially bounded by a plurality of furrows 20 as three-dimensional structural elements. The furrows 20 have a cross section having a rectangular contour with essentially perpendicular side walls having a height of, for example, 2 µm and a base area having a width of, for example, 2 µm. The aspect ratio of the furrows is thus 1:1. The surface regions 12 form, in plan view, a pattern with square units, as is illustrated, for example, in FIG. 2a, and are arranged in gaps 14, 15.

As can be seen in FIG. 1c, a pigment material layer 19 consisting of copper is applied by a roll-to-roll process to the surface structure 10, i.e. on top of the embossing layer 13 with the surface regions 12 and the furrows 20, in step b) of the process. In alternative examples, a pigment material layer 19 consisting of a multilayer interference coating, optionally a double interference coating, can be applied. This corresponds to step S2 in the flow diagram of FIG. 9. The pigment material layer 19 is provided on the surface regions 12 and in the furrows 20. The furrows 20 form a binary cross-sectional profile parallel to the surface regions 12. The binary profiles represent a very good intended fracture position since the pigment layer applied is interrupted by the height difference. In this way, intended fracture positions for production of the pigments are provided in the pigment material layer 19 applied to the surface structure.

Figure 2A:
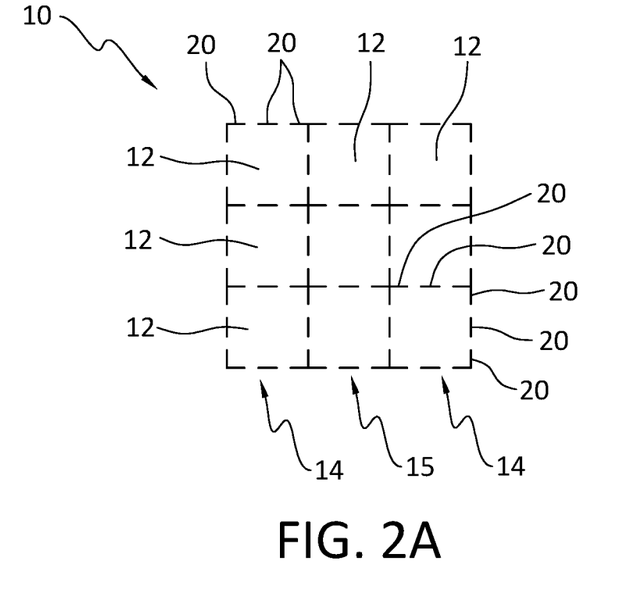
FIGS. 2a and 2b show a surface structure produced by the process of the first working example in a schematic plan view.

FIG. 2a schematically shows the surface structure 10 produced by the process of the first working example in plan view. The square surface regions 12 are arranged in mutually parallel gaps 14 and 15. The furrows 20 have a cross shape at the corners of the surface regions 12 and a longitudinal shape at the sides of the surface regions 12. Thus, the furrows 20 form a pattern bounding the surface regions. Owing to the spacings between the furrows 20, the surfaces of adjacent surface regions 12 are joined to one another.

In step c) of the process (not shown), the pigment material layer 19 consisting of copper is detached from the surface structure 10 by the embossing coating composed of PVOH of the release layer being dissolved by water. If the embossing coating of the release layer consists of a water-insoluble thermoplastic, other solvents are used. The furrows 20 define the intended fracture positions, and the connecting lines between the neighbouring furrows 20 define fracture lines on detachment of the pigment layer 19 and production of the pigments in step c). The fracture lines between the furrows 20 have, in the present example, a length of about 15 µm at a diameter of the pigments produced of about 25 µm. A plurality of copper pigments having essentially the same square shape and a narrow size distribution are produced on detachment of the pigment material layer 19 by fracture at the furrows 20 and at the fracture lines between the furrows 20 of the pigment material layer 19. This corresponds to step S3 in the flow diagram of FIG. 9. When a multilayer interference coating is used as pigment material layer 19, interference pigments are produced.

The intended fracture positions do not coincide entirely with the furrows 20 on detachment of the pigment material layer 19, but instead also encompass the fracture lines inbetween. The fracture lines lead predominantly to clean fracture edges which in the present example run perpendicularly to the surface of the pigment. This prevents active and costly pigment material from being lost at the fracture line between the three-dimensional structural elements. At the same time, a high yield and a high quality of the pigments produced are obtained.

Figure 2B:
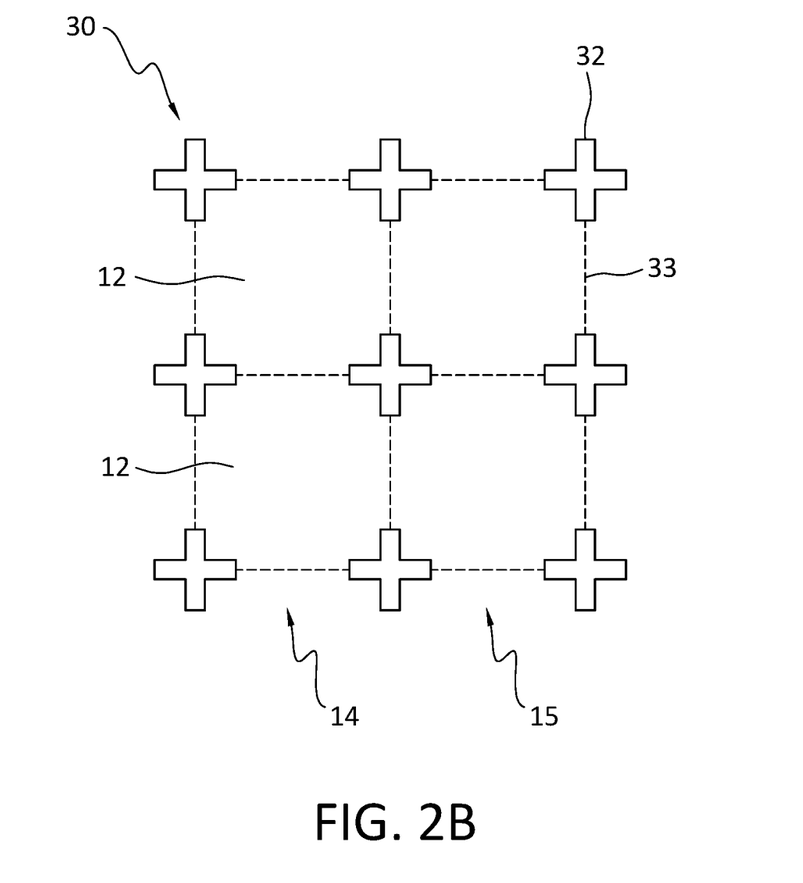

FIG. 2b schematically shows a surface structure 30 which has size of 20 µm×20 µm and is likewise obtainable by the process of the first working example. The surface regions 12 form, in plan view, a pattern having square units and are arranged in gaps 14, 15. Furrows 32 are formed only at the corners of the surface region 12 and have a cross shape. In this way, the furrows 32 form a pattern bounding the surface regions 12. The furrows 32 have essentially perpendicular side walls having a height of, for example, 2 µm and a base area having a width of, for example, 2 µm. The furrows 32 determine the intended fracture positions, and the connecting lines between neighbouring furrows 32 determine the fracture lines 33 on detachment of the pigment layer 12 and production of the pigments in step c). The fracture lines 33 between the furrows have a length of 15 µm in the present example. A plurality of copper pigments having essentially the same square shape and having a narrow size distribution are produced on detachment of the pigment material layer 19 by fracture at the furrows 32 and at the fracture lines 33 between the furrows 32 of the pigment material layer 19.

Figure 3:
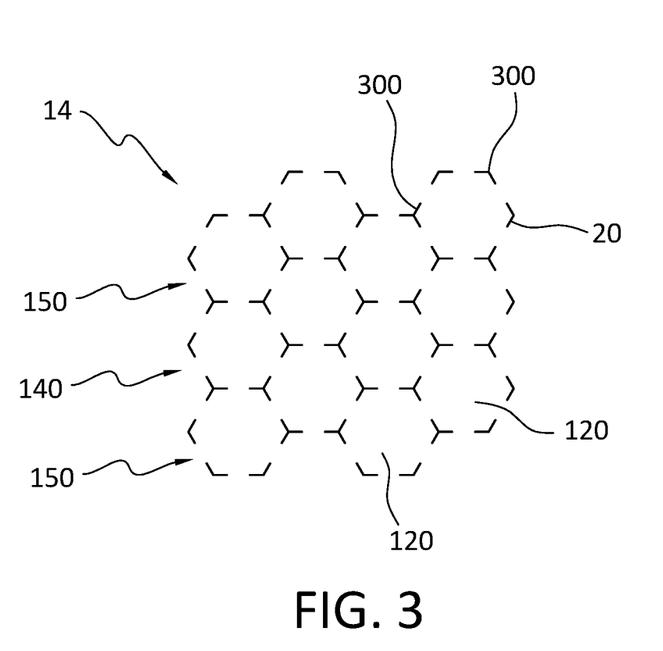
FIG. 3 shows a schematic surface structure which is likewise obtainable using the process of the first working example.

FIG. 3 schematically shows a surface structure 40 which is likewise obtainable by the process of the first working example. The surface regions 120 form, in plan view, a pattern having hexagonal units and are arranged in gaps 140, 150. Walls 300 are formed as three-dimensional structural elements bounding the surface regions 120. The walls 300 are formed only at the corners of the surface regions 120. The walls 300 have, for example, essentially perpendicular side walls having a height of, for example, 2.5 µm and a width of, for example, 2 µm. The walls 300 define the intended fracture positions, and the connecting lines between neighbouring walls 300 define the fracture lines on detachment of the pigment layer 19 and production of the pigments in step c).

Figure 4A:
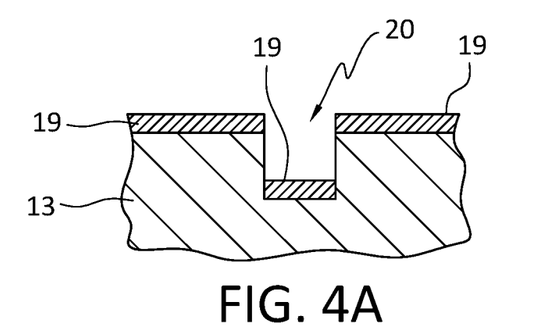
FIGS. 4a to 4d show schematic cross sections of three-dimensional structural elements which can be formed in working examples of the process.
Figure 4B:
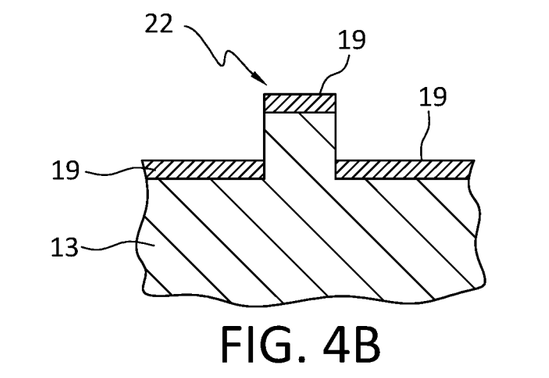
Figure 4C:
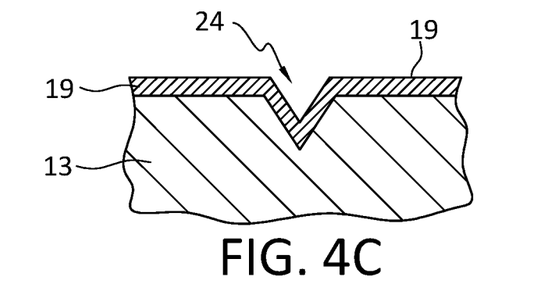
Figure 4D:
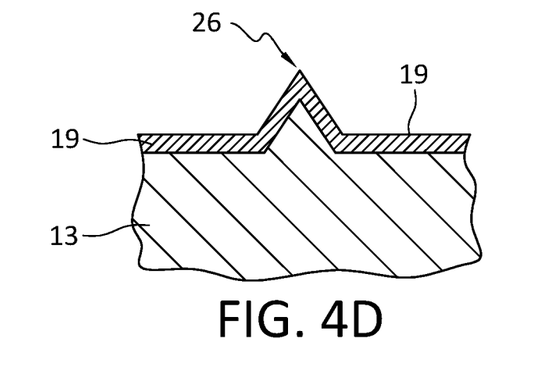

FIGS. 4a to 4d show schematic variants of cross sections of three-dimensional structural elements which can be formed in working examples of the process. FIG. 4a shows the surface structure 10 covered with the pigment material layer 19 which is produced in the first working example of the process and is depicted in FIG. 1c. As an alternative, walls 22 instead of furrows can be formed as three-dimensional structural elements in the embossing layer 13 in the embossing step a) of the process, as shown in FIG. 4b. The formation of the walls 22 also leads to a binary cross-sectional profile of the surface structure, with the walls 22 being formed parallel to the surface regions 12. This binary profile also represents a very good intended fracture position since the applied pigment layer 19 is interrupted by the height difference. Instead of the furrows 20 having a rectangular cross-sectional contour and essentially perpendicular side walls, it is possible to produce furrows 24 having a width of, for example, 2 μm with slanted side walls having a height of, for example, 2 μm, as is depicted in FIG. 4c. As an alternative, walls 26 having a width of, for example, 2.5 μm and slanted side walls having a height of, for example, 3 μm can be formed as three-dimensional structural elements, as shown in FIG. 4d.

A second working example of the process likewise comprises three steps. In step a), a three-dimensional surface structure is produced by an embossing process, corresponding to step S1 in the flow diagram of FIG. 9. For this purpose, a carrier film of PET (polyethylene terephthalate) is provided as the substrate. An insoluble embossing layer 13 composed of water-insoluble hot embossing coating PMMA (polymethyl methacrylate) is applied to the surface of the carrier film in a roll-to-roll process. Alternative water-insoluble thermoplastic hot embossing coatings are PVA (polyvinyl acetate) or PS (polystyrene). A surface structure 10 having similarly shaped surface regions 12, which each have a square, flat area 16 and are arranged in gaps 14 and 15, is produced in the embossing layer 13 by hot embossing using a roll-to-roll process in a manner analogous to the first example.

A release layer (not shown) composed of water-soluble PVOH is printed in a roll-to-roll process onto the surface structure 10 produced in step a) of the second working example. The layer thickness of the release layer relative to the height difference of the surface regions 12 is selected so that it covers the latter and follows the raised regions and depressions in the surface structure 10. That is to say, the release layer is formed as a layer conforming to the surface structure 10. The release layer can be applied preferably in a layer thickness of from 50 nm to 2 μm. The release layer can, for example, be applied by means of gravure printing, flexographic printing, slot nozzle or spray nozzle. In the present example, a PVOH layer having a thickness of 500 nm is applied by means of gravure printing.

Figure 9:
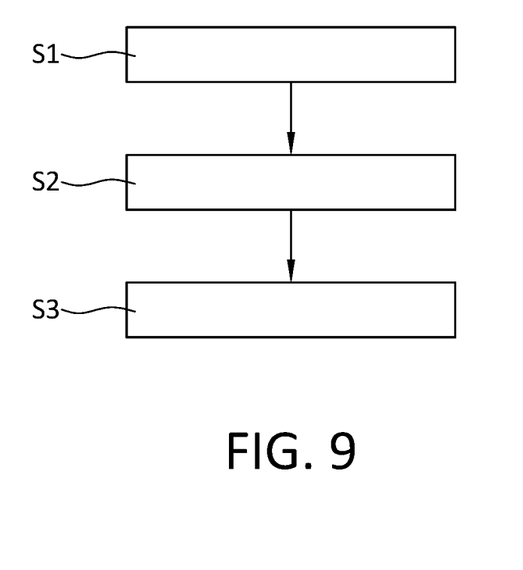
FIG. 9 shows a schematic flow diagram of embodiments of the process.

In step b) of the process, a pigment material layer composed of aluminium (not shown) is applied to the release layer by a PVD process, which corresponds to step S2 in the flow diagram of FIG. 9. Intended fracture positions and fracture lines for later production of the pigments are provided in the pigment material layer applied to the release layer in the manner described above for the first working example.

In step c) of the process, the pigment material layer composed of aluminium is detached from the surface structure 10 by the release layer being dissolved by means of water. Here, a plurality of aluminium pigments having essentially the same hexagonal contour and a narrow size distribution is produced by breaking at the intended fracture positions of the pigment material layer, which corresponds to step S3 in the flow diagram of FIG. 9.

Figure 5A:
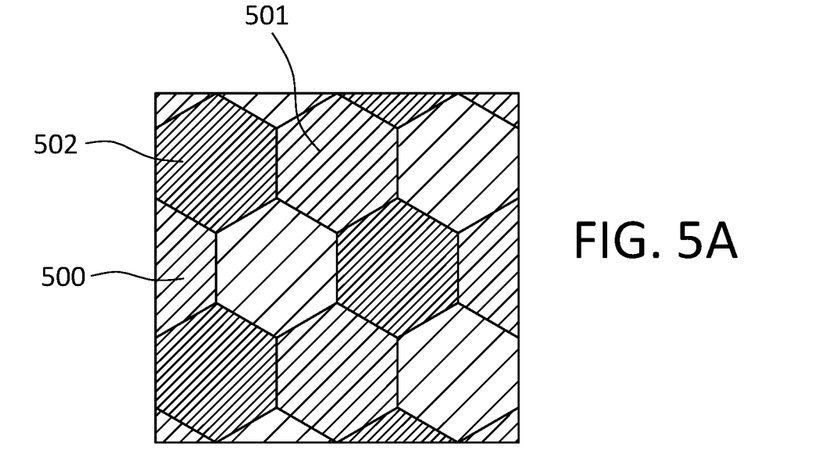
FIG. 5a shows a schematic plan view of a surface structure having hexagonal surface regions.
Figure 5B:
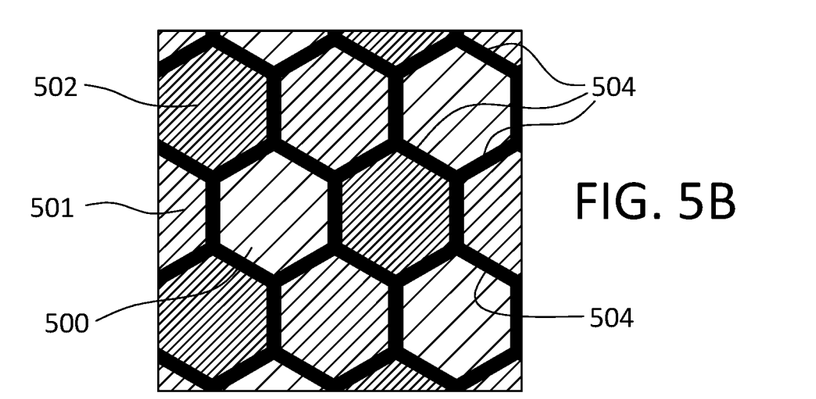
FIGS. 5b and 5c show schematic plan views of illustrative surface structures having hexagonal surface regions.
Figure 5C:
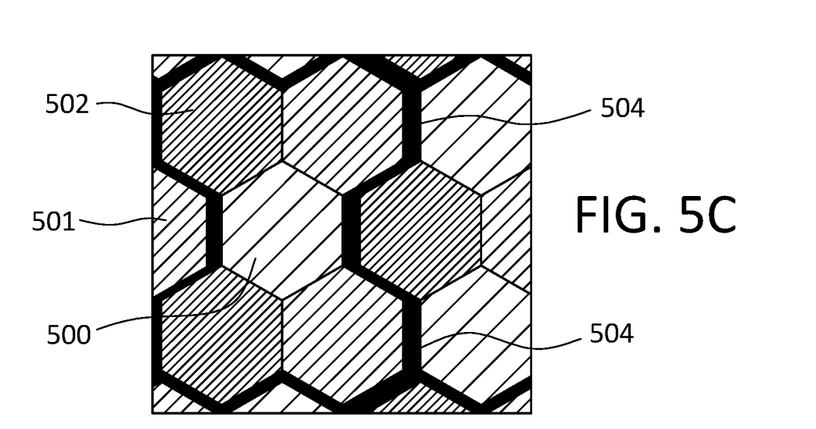

FIGS. 5a to 5c schematically show, in plan view, surface structures having hexagonal surface regions. The illustrative surface structures of FIGS. 5b and 5c can be produced as per the first or the second working example of the process. The surface regions are formed on three different height levels in step a). FIGS. 5a to 5c show the surface regions at different heights with different degrees of lightness. The surface regions 502 (low lightness) are present at the highest height level, the surface regions 500 (high lightness) are located on the lowest height level and the surface regions 501 (medium lightness) are located on a height level between the height levels of the surface regions 500 and 502. The height variation is, for example, from 2 to 5 μm. The surface regions 500 and 501 of the example of FIG. 5b are each bounded on three of six sides of the hexagonal contour by furrows 504 (shown in black) as three-dimensional structural elements. The furrows 504 are as deep as the height difference between the surface regions 500 and 502 in total and are fragmented (not shown in FIG. 5b). Fragmentation is realized in a manner analogous to that shown in FIGS. 8a to 8c. In the case of the surface regions 501 to 503 in the example of FIG. 5c, only the adjacent surface regions 500 and 501 are separated off by furrows as three-dimensional structural elements on one of the sides of the hexagonal contour, i.e. are partly separated off. The furrows of the surface structure of FIG. 5c have fragmentation (not shown in FIG. 5c) analogous to that shown in FIGS. 8a to 8c. The furrows of the surface structures of FIGS. 5b and 5c are as deep as the height difference between the surface regions 500 and 502 in total. The furrows 504 serve as deaeration slits during embossing, so that air inclusions can escape along the furrows at the highest level during embossing.

Figure 6A:
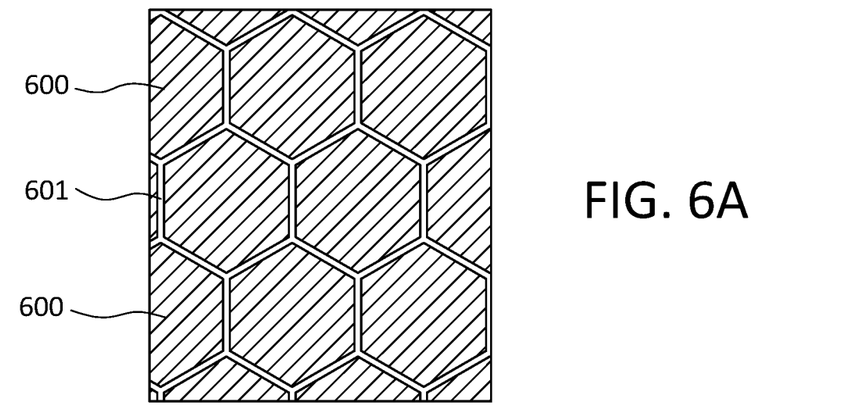
FIGS. 6a to 6c show schematic plan views of illustrative surface structures having hexagonal surface regions.
Figure 6B:
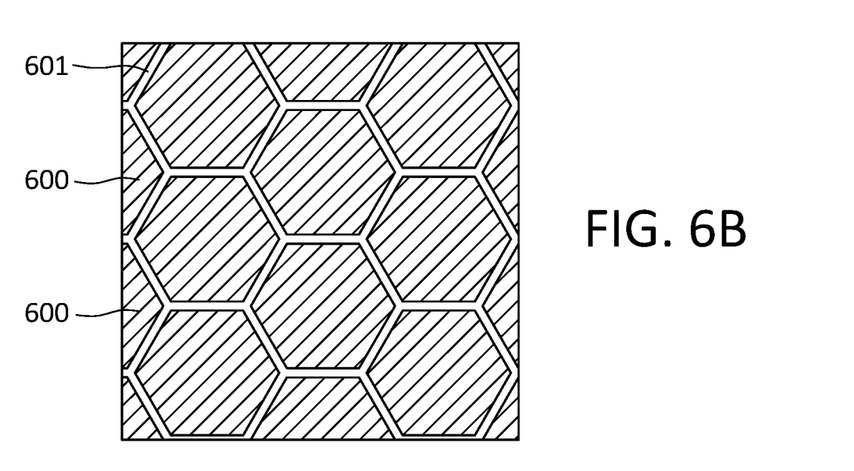
Figure 6C:
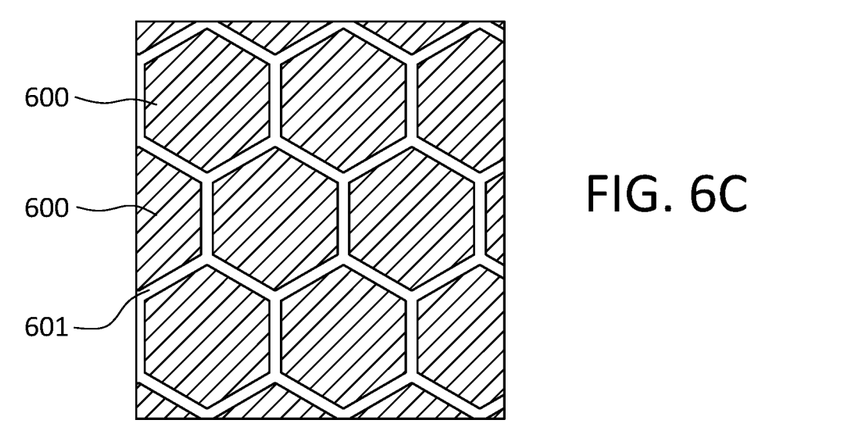
Figure 7A:
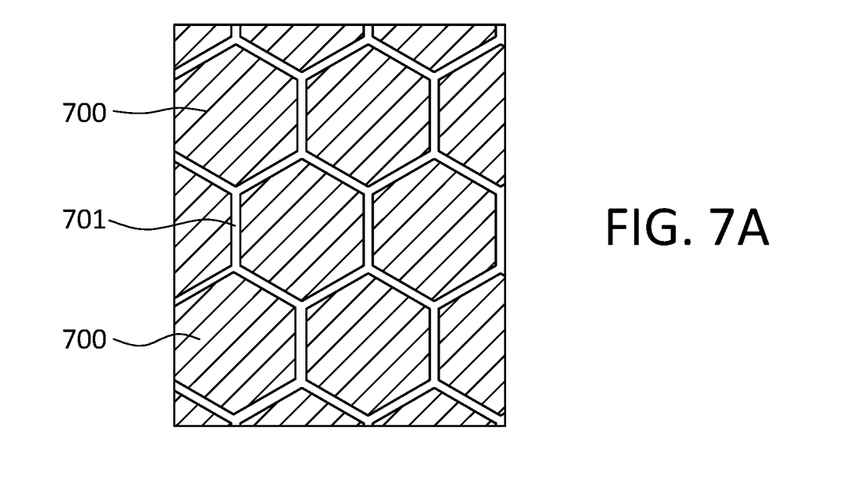
FIGS. 7a to 7c show schematic plan views of illustrative surface structures having hexagonal surface regions.
Figure 7B:
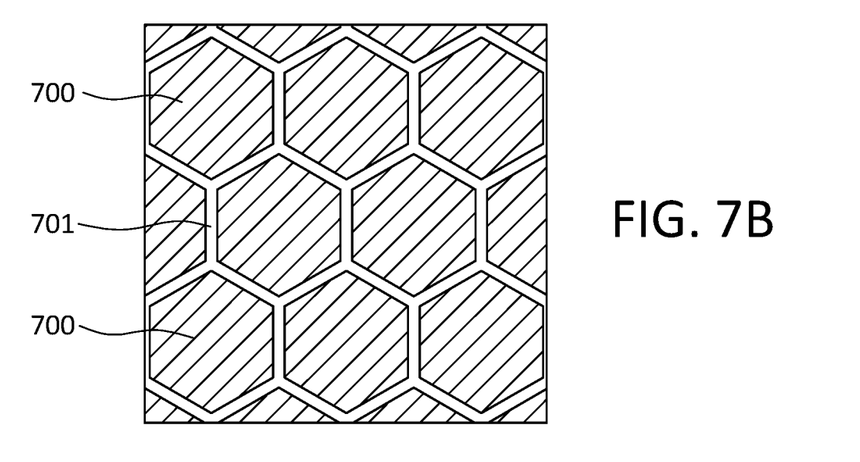
Figure 7C:
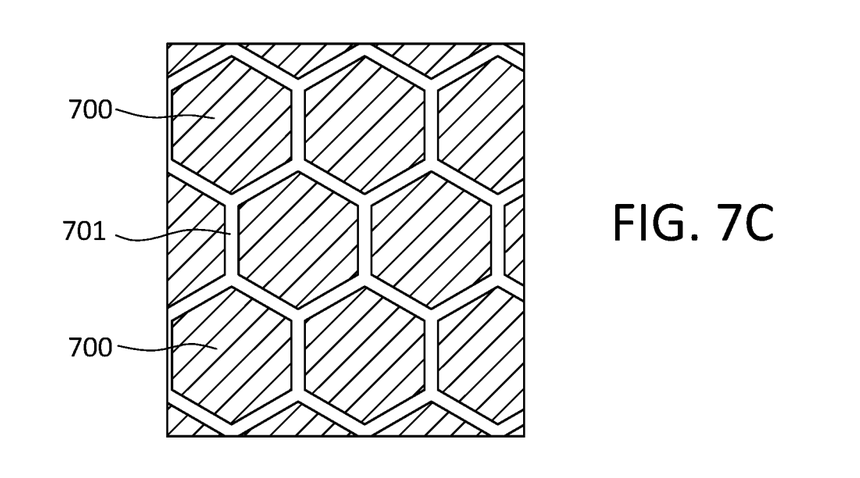

FIGS. 6a to 6c schematically show, in plan view, illustrative surface structures having hexagonal surface regions 600 which are produced as per the first or second working example of the process. The surface regions 600 are formed on one height level in step a) and are bounded by furrows 601 as three-dimensional structural elements which are fragmented (not shown in FIGS. 6a to 6c). Fragmentation is realized in a manner analogous to that shown in FIGS. 8a to 8c. The width of the furrows 601 increases from FIG. 6a to FIG. 6b.

Figure 8A:
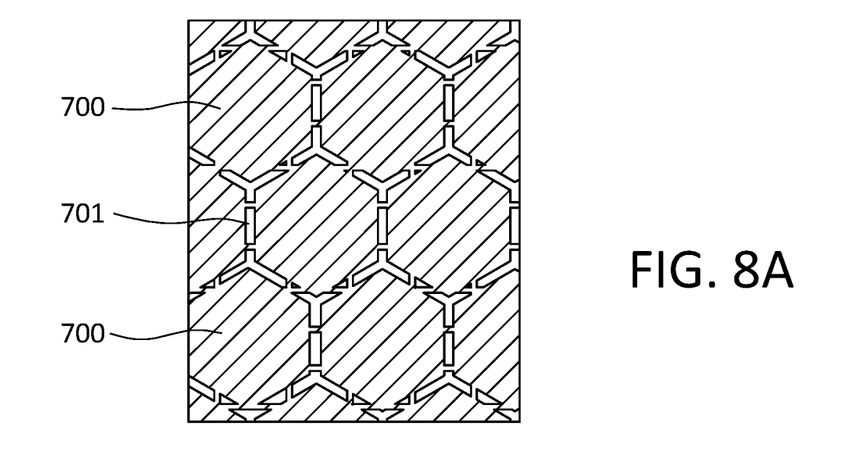
FIGS. 8a to 8c show schematic plan views of illustrative surface structures having hexagonal surface regions and fragmentations of three-dimensional structural elements.
Figure 8B:
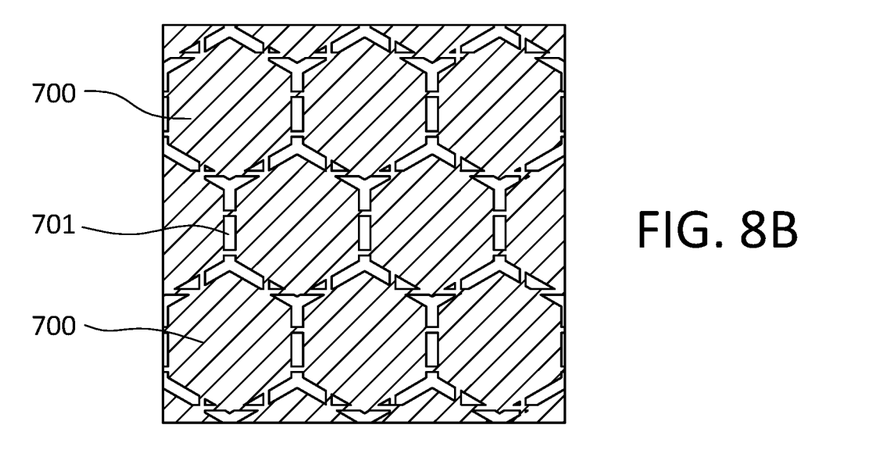
Figure 8C:
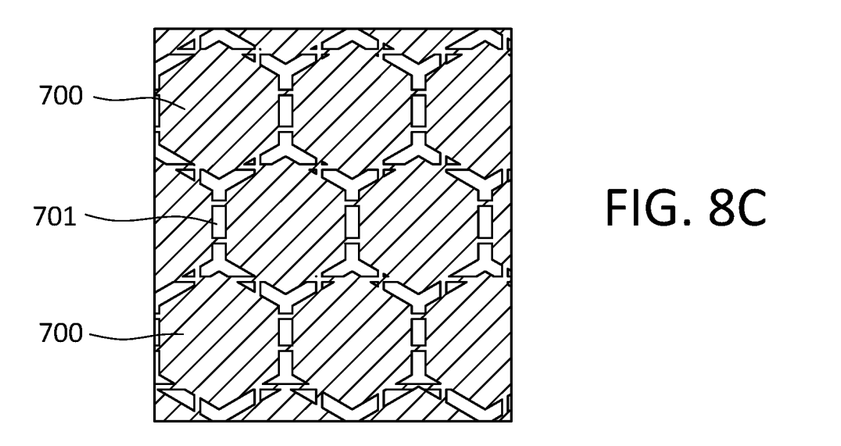

FIGS. 7a to 7c and FIGS. 8a to 8c schematically show, in plan view, illustrative surface structures having hexagonal surface regions 700. These can be produced as per the first or second working example of the process. Here, the surface regions 700 are formed on one height level in step a) and are bounded by walls 701 as three-dimensional structural elements which are fragmented. The fragmentation is not shown in FIGS. 7a to 7c but is depicted in FIGS. 8a to 8c. The width of the walls 701 increases from FIG. 7a to FIG. 7b and from FIG. 8a to FIG. 8c.

All embodiments and working examples make it possible to reduce the proportion by area of the surface structure which is occupied by the three-dimensional structural elements which bound the surface regions. A higher yield with a narrower size distribution of the pigments is achieved in this way while avoiding artefacts at the fracture edges of the pigments.

The invention claimed is:

1. A process for producing pigments having a defined size and shape, comprising the steps:
   a) production of a three-dimensional surface structure on a substrate, with surface regions which are in each case partly bounded by a plurality of three-dimensional structural elements and are arranged in gaps being formed;
   b) application of a pigment material layer to the surface structure;
   c) detachment of the pigment material layer from the surface structure and production of pigments;
   wherein in step a) adjacent surface regions are connected to one another.

2. The process according to claim 1, wherein the surface regions are in each case bounded to an extent of from 1% to 99%, by the three-dimensional structural elements; and/or
   the surface structure and/or the surface regions are occupied to an extent of from 0.1 to 10%, by the three-dimensional structural elements.

3. The process according to claim 1, wherein the three-dimensional structural elements are arranged separately from one another; and/or
   the three-dimensional structural elements are, in plan view onto the surface structure, arranged at corners and/or sides of the surface regions.

4. The process according to claim 1, wherein each boundary between adjacent surface regions is provided with at least two of the three-dimensional structural elements which are arranged along the boundary; and/or
   at least part of the adjacent surface regions is formed with a partially contiguous surface.

5. The process according to claim 1, wherein at least part of the three-dimensional structural elements are formed, in plan view onto the surface structure, as a regular pattern which partially bounds the surface regions; and/or
   at least part of the three-dimensional structural elements are, in plan view onto the surface structure, formed as a pattern selected from among a polygonal pattern, a pattern of mutually complementary shapes and a free-form pattern.

6. The process according to claim 1, wherein at least part of the surface regions is formed parallel to a base level of the surface structure; and/or
   at least part of the surface regions is formed with a gradient which runs obliquely to a base level of the surface structure.

7. The process according to claim 1, wherein at least part of the surface regions is formed on the same height level; and/or
   at least part of the surface regions is formed on different height levels; and/or
   at least part of adjacent surface regions is formed on different height levels.

8. The process according to claim 1, wherein at least part of the three-dimensional structural elements are formed as raised regions arranged between the surface regions; and/or
   at least part of the three-dimensional structural elements are formed as depressions arranged between the surface regions; and/or
   at least part of the three-dimensional structural elements are formed as deaeration structures arranged between the surface regions.

9. The process according to claim 1, wherein at least part of the three-dimensional structural elements are formed with a width of from 0.2 µm to 4 µm, and/or a height of from 1 µm to 10 µm; and/or
   at least part of the three-dimensional structural elements are formed with identical or different dimensions.

10. The process according to claim 1, wherein at least part of the surface regions are formed with the same size and/or same shape.

11. The process according to claim 1, wherein at least part of the surface regions are, in plan view onto the surface structure, formed with a contour selected from among a polygon contour, a mutually complementary contour and a free-form contour; and/or
    at least part of the surface regions are provided with one or more markings.

12. The process according to claim 1, wherein the production of the three-dimensional surface structure in step a) is at least partly carried out by an embossing process; and/or
    the production of the three-dimensional surface structure in step a) is carried out by a method selected from among:
    a1) an embossing process comprising the steps: application of a soluble embossing layer as release layer to the substrate and performance of a lithographic, hot embossing or UV embossing; and
    a2) an embossing process comprising the steps: provision of a substrate which can be deformed by means of hot embossing or application of an insoluble embossing layer to the substrate, performance of hot embossing or UV embossing; and
    application of a soluble release layer.

13. The process according to claim 1, wherein a pigment material layer comprising one or more inorganic materials and/or one or more organic materials is applied to the surface structure in step b).

14. Pigments produced by a process according to claim 1.

15. The use of pigments according to claim 14 in a printing ink.

16. A process for producing pigments having a defined size and shape, comprising the steps:
    a) production of a three-dimensional surface structure on a substrate, with surface regions which are in each case partly bounded by a plurality of three-dimensional structural elements and are arranged in gaps being formed;
    b) application of a pigment material layer to the surface structure;
    c) detachment of the pigment material layer from the surface structure and production of pigments;
    wherein the surface regions are in each case bounded to an extent of from 1% to 99%, by the three-dimensional structural elements; and
    wherein the surface structure and/or the surface regions are occupied to an extent of from 0.1 to 10%, by the three-dimensional structural elements.

* * * * *